United States Patent [19]

Nishimura

[11] Patent Number: 4,710,831
[45] Date of Patent: Dec. 1, 1987

[54] LOADING AND UNLOADING SYSTEM FOR FLEXIBLE DISC DRIVE APPARATUS

[75] Inventor: Akimasa Nishimura, Kanagawa, Japan

[73] Assignee: Canon Kabushiki Kaisha, Tokyo, Japan

[21] Appl. No.: 659,703

[22] Filed: Oct. 11, 1984

[30] Foreign Application Priority Data

Oct. 19, 1983 [JP] Japan .................... 58-195507

[51] Int. Cl.⁴ ............... G11B 17/035; G11B 5/016; G11B 15/64
[52] U.S. Cl. .................... 360/99; 360/71; 360/86; 360/130.34; 369/77.2; 369/261; 369/262
[58] Field of Search .......... 360/69, 71, 86, 102, 360/97-99, 133, 130.34, 135, 96.5; 369/75.2, 77.1, 77.2, 258, 261, 262

[56] References Cited

U.S. PATENT DOCUMENTS

| | | | |
|---|---|---|---|
| 3,959,823 | 5/1976 | Heidecker et al. | 360/99 |
| 4,246,618 | 1/1981 | Bauer | 360/99 |
| 4,315,289 | 2/1982 | Holecek et al. | 360/99 |
| 4,466,032 | 8/1984 | Saito | 360/99 |
| 4,476,556 | 10/1984 | Nagami et al. | 369/258 |
| 4,546,396 | 10/1985 | Schatteman | 360/96.5 |

Primary Examiner—Stuart N. Hecker
Assistant Examiner—Benjamin E. Urcia
Attorney, Agent, or Firm—Toren, McGeady & Associates

[57] ABSTRACT

A recording and/or reproducing apparatus using a disc-shaped flexible record-bearing medium such as a disc-shaped flexible magnetic sheet, which includes a loading device for placing the medium at a predetermined position for signal recording and/or reproduction, a recording and/or reproducing head arranged to confront the medium when the medium is placed at the predetermined position, a rotation mechanism for rotating the medium relative to the head, a stop member for stopping the rotation of the medium by the rotation mechanism, and a control system responsive to the stop member for causing the loading device to retract the medium from the predetermined position, whereby the medium is prevented from being deformed by the head in a condition in which the medium is not being rotated by the rotation mechanism.

9 Claims, 13 Drawing Figures

LOADING AND UNLOADING SYSTEM FOR FLEXIBLE DISC DRIVE APPARATUS

BACKGROUND OF THE INVENTION

1. Field of the Invention

This invention relates to a recording and/or reproducing apparatus of the kind arranged to record information on a flexible disc-shaped record-bearing medium in concentric or helical recording tracks, or to reproduce the record information from the record-bearing medium by means of a recording and/or reproducing head.

2. Description of the Prior Art

With regard to a recording and/or reproducing apparatus of the kind arranged to record or reproduce information by a recording and/or reproducing head on or from a flexible disc-shaped record-bearing medium such as a flexible magnetic disc-shaped sheet with the information recorded in a state of either concentric or helical recording tracks on the medium, many and varied methods have been contrived and proposed for keeping the head in a satisfactorily and stable confronted state with the magnetic sheet. The term "confronted state" as used herein for the purpose of this invention means a state of the head being either in contact or not in contact with the magnetic sheet.

In cases where the magnetic sheet is of a small diameter, it is nearly impossible to utilize an air flow which arises from the rotation of the magnetic sheet for stabilization thereof as in the case of the magnetic sheet of a relatively large diameter. In the case of the small diameter magnetic sheet, therefore, the confronted state between the sheet and the head must be stabilized by some other means. To meet this requirement, it is conceivable to have the magnetic sheet pushed against the recording and/or reproducing head by means of a pushing pad in the same manner as generally employed for a floppy disc device. In the event of a relatively thin magnetic sheet (30 to 40 μm), however, this method causes the magnetic sheet to be warped by the pushing pad. Further, the magnetic sheet might be damaged in case of high speed rotation of the magnetic sheet.

To solve this problem, there has been proposed a method for obtaining a stable confronted state between the head and the sheet, in which a head is confronted with the recording surface of a relatively thin magnetic sheet of a small diameter and a stabilizing plate is arranged on the reverse side of the magnetic sheet to closely confront the head through the sheet in such a way as to stabilize the magnetic sheet relative to the head. In this case, the stabilizing plate is provided with an escape groove for avoiding collision with the head. The head is arranged in a position corresponding to this escape groove of the stabilizing plate and to protrude somewhat further than the rotating surface of the magnetic sheet toward the stabilizing plate.

In accordance with this method, if the magnetic sheet is left in a stationary state or a non-rotating state over a long period of time under the above-stated condition, the magnetic sheet might come to have plastic deformation. Such deformation of the sheet makes satisfactory recording and reproducing operations nearly impossible.

SUMMARY OF THE INVENTION

The present invention is directed to the solution of the above-stated problem of the prior art described above. It is therefore a principal object of the invention to provide a recording and/or reproducing apparatus of the kind arranged to perform recording and/or reproducing operations on a flexible disc-shaped record-bearing medium by rotating the medium, wherein the recording and/or reproducing head of the apparatus never causes plastic deformation of the record-bearing medium even when the medium is left in a state of being loaded on the apparatus without being rotated for a long period of time.

It is another object of the invention to provide a recording and/or reproducing apparatus which is capable of attaining the above-stated object of the invention without imposing any load on the recording and/or reproducing head and a mechanism related to the object without degrading the positional precision of the head, without complicating the related mechanism and without increasing the size of the mechanism.

These objects are achieved, according to a preferred embodiment embodying an aspect of the present invention, in a recording and/or reproducing apparatus using a disc-shaped flexible record-bearing medium, comprising loading means for placing the medium at a predetermined position for the signal recording and/or reproduction, a recording and/or reproducing head arranged to confront the medium when the medium is placed at the predetermined position, rotation means for rotating the medium relative to the head, stop means for stopping the rotation of the medium by the rotation means, and control means responsive to the stop means for causing the loading means to retract the medium from the predetermined position, whereby the medium is prevented from being deformed by the head in a condition in which the medium is not being rotated by the rotation means.

These and further objects and features of the invention will become apparent from the following description of a preferred embodiment thereof taken in connection with the accompanying drawings:

BRIEF DESCRIPTION OF THE DRAWINGS

A preferred embodiment of this invention is arranged as shown in the accompanying drawings, wherein FIG. 1(b) showing them in a state of having the upper stabilizing plate along moved away from the magnetic sheet; and FIG. 1(c) showing them in a state of having both the upper and lower stabilizing plates moved away from the magnetic sheet.

DETAILED DESCRIPTION OF THE PREFERRED EMBODIMENT

In the embodiment of the present invention described below, the recording and/or reproducing apparatus is a magnetic recording and/or reproducing apparatus. Accordingly, the recording and/or reproducing head is a magnetic head and the flexible disc-shaped record-bearing medium is a flexible disc-shaped magnetic sheet. This magnetic sheet is stowed in a cassette.

Figure 2:
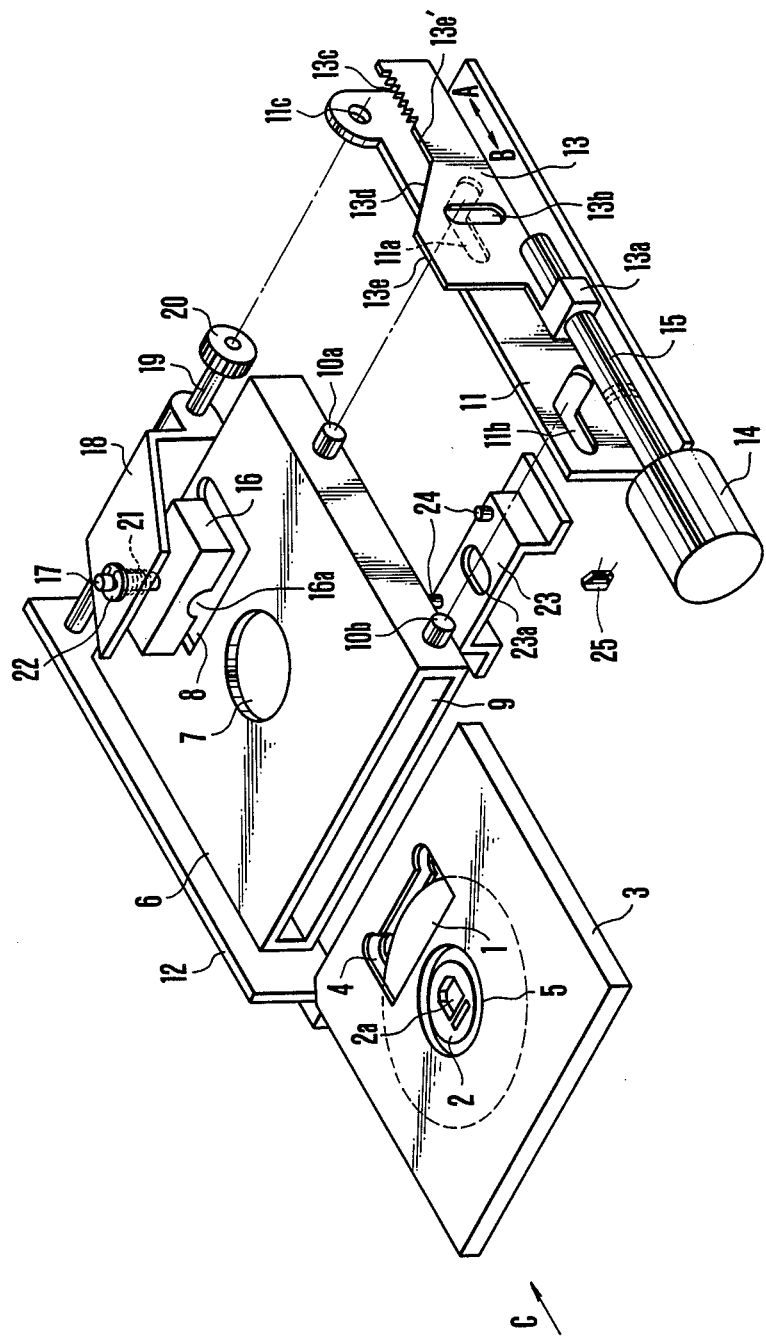
FIG. 2 is a perspective view showing a recording and/or reproducing apparatus as an embodiment of the invention and showing, particularly, the component members of a cassette loading part in an exploded manner.
Figure 3A:
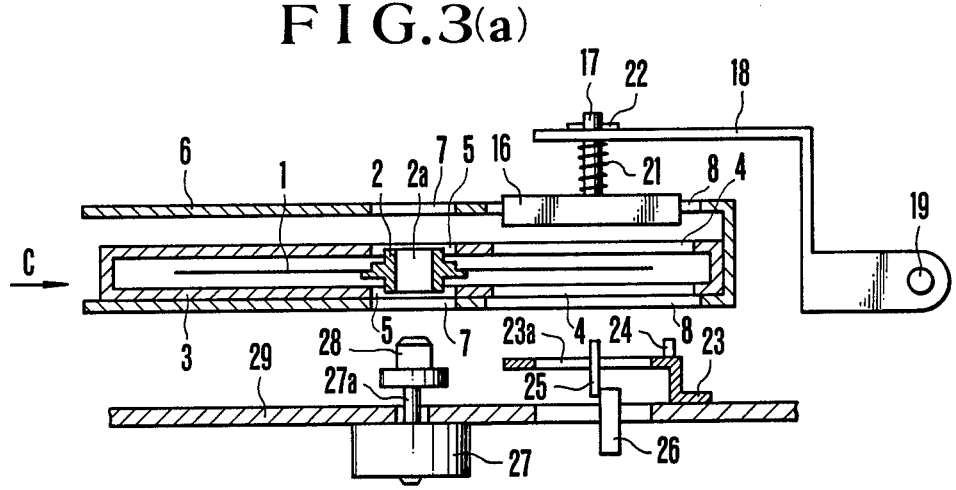
FIGS. 3(a), 3(b) and 3(c) are sectional views showing the positions of the upper and lower stabilizing plates and that of the magnetic head relative to the magnetic sheet disposed within a cassette which is inserted into a cassette holder, FIG. 3(a) showing them as in a state of having the cassette inserted into the cassette holder, FIG. 3(b) showing them as in a state of having the cassette loaded or set in a predetermined position for recording and/or reproduction, and FIG. 3(c) showing them as in a state of having the cassette holder and the upper stabilizing plate slightly moved upward.
Figure 3B:
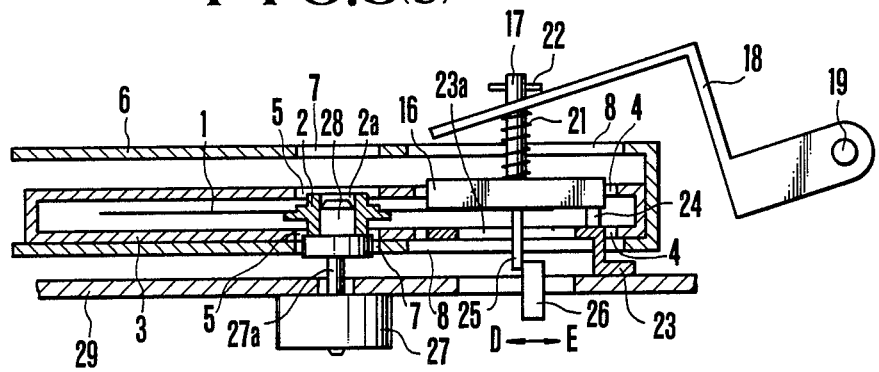
Figure 3C:
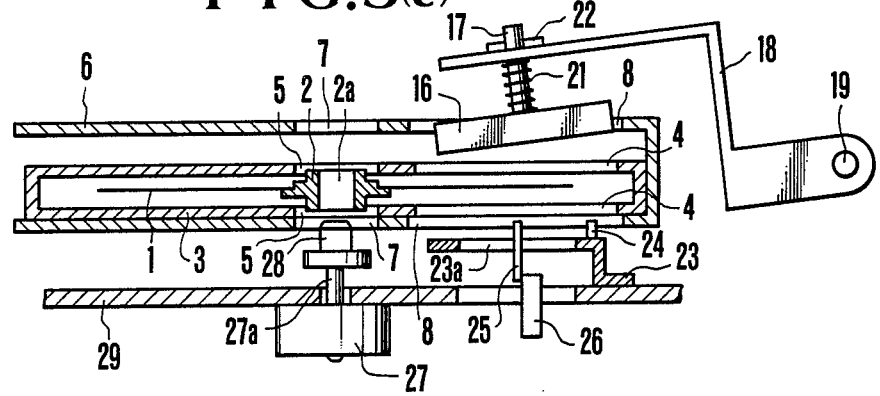

Referring to FIG. 2, a cassette 3 is shown as in a state of being pulled out of a cassette holder 6. The cassette holder 6 is shown as in a state of being separated from a side plate 11. A lower stabilizing plate 23, which is located below a line connecting a guide pin 10a to a guide slot 11a, is shown in a state of being moved to a place below a line connecting another guide pin 10b to another guide slot 11b. A magnetic sheet 1 is a flexible disc shaped record-bearing medium. The magnetic sheet 1 is provided with a center core 2 which is disposed in the middle part of the sheet 1. The center core 2 is provided with a spindle inserting hole 2a which is arranged to have a driving spindle 28 inserted therein for rotating the magnetic sheet 1. The cassette 3 is arranged to stow the magnetic sheet 1 therein. A pair of holes 5 are formed in the middle of upper and lower surfaces of the cassette 3 in places corresponding to the center core 2. The cassette 3 is provided further with a magnetic head inserting window 4 which is formed in a place corresponding to a recording area. The cassette holder 6 is arranged to have the cassette 3 inserted therein and is provided with a pair of holes 7 which are formed on upper and lower surfaces of the holder 6 in places corresponding to the holes 5 of the cassette 3. The cassette holder 6 carries the cassette 3, inserted therein via a cassette inserting opening 9 in the direction of arrow C, and moves the cassette 3 to a predetermined loading position for recording and reproduction. The cassette holder 6 is provided further with inserting windows 8, which are formed in the upper and lower surfaces thereof, through which to have upper and lower stabilizing plates 16 and 23 are inserted. Side plates 11 and 12 are secured to the chassis 29 of the apparatus, which is shown in FIGS. 3(a), 3(b) and 3(c), and are arranged to movably carry the cassette holder 6 on two sides thereof. On one side of the cassette holder 6, there are provided guide pins 10a and 10b which slidably engage guide slots 11a and 11b formed in the side plate 11. Each of these guide slots 11a and 11b consists of flat and slanting parts. The other side plate 12 is also provided with guide slots (not shown) which are of the same shape as the guide slots 11a and 11b. Guide pins, which are of the same shape as the guide pins 10a and 10b, are provided also on the opposite side of the cassette holder 6 and slidably engage the guide slots in the same manner as the guide pins 10a and 10b. A hole 11c is formed in one end part of the side plate 11 and is arranged to rotatably carry a rotating shaft 19 which is arranged to move an upper stabilizing plate 16. A slider 13 serves as record bearing medium moving means for moving the cassette 3 together with the cassette holder 6 between the loading position and a non-loading position. The upper side of the slider 13 consists of a raised flat part 13e, a slanting part 13d, a lower flat part 13e' and a rack part 13c. A protruding part 13a is disposed at one end of the slider 13 and is provided with a hole having a female thread formed on the inside thereof. A screw shaft 15 is arranged to engage the female thread. A vertically extending slot 13b is formed in the slider 13 and confronts the guide slot 11a of the side plate 11. The guide pin 10a of the cassette holder 6 slidably engages these slots 11a and 13b. The rack part 13c of the slider 13 engages a gear 20 which will be described later. Switches SW1, SW2 and SW3, which will be described later, are arranged to be controlled by the lower flat part 13e', the slanting part 13d and the raised flat part 13e of the slider 13 when the slider 13 is moved in the directions of arrows A and B.

A loading motor 14 is provided with the screw shaft 15 which is coaxially mounted on the output shaft of the motor 14. The screw shaft 15 engages the female thread of the protrudent part 13a of the slider 13 to move the slider 13 either in the direction of arrow A or B according to whether the loading motor 14 rotates in a normal or reverse direction. The upper magnetic sheet stabilizing plate 16 is arranged to be shiftable between an operating position in which it confronts the upper surface of the magnetic sheet 1 and an inoperative position in which it is removed from the magnetic sheet 1. The upper stabilizing plate 16 is provided with an escape groove 16a which is formed in the middle part of the lower side of the plate 16 confronting the sheet 1 and extends in the radial direction of the sheet 1, i.e. in a direction corresponding to the moving path of a magnetic head 25. A pin 17 is secured to the upper side of the upper stabilizing plate 16 and is vertically slidably carried by an upper stabilizing plate holder 18. A retaining washer 22 is secured to the upper end part of the pin 17. A compression spring 21 is inserted between the stabilizer plate 16 and the stabilizer plate holder 18 and is arranged to urge them to move away from each other.

A rotating shaft 19 has the stabilizing plate holder 18 secured thereto. One end of the rotating shaft 19 is rotatably connected to one end of the side plate 12. The other end of the rotating shaft 19 is inserted in the hole 11c of the other side plate 11. The gear 20 is attached to the end part of the rotating shaft 19 which engages the hole 11c of side plate 11. The gear 20 engages the rack part 13c of the slider 13. The gear 20 turns either counterclockwise or clockwise accordingly as the slider 13 moves in the direction of arrow A or B. With the gear 20 thus turned, the stabilizing plate 16 is moved upward or downward. The stabilizing plate 16, which is connected to the holder 18, is thus moved by the moving means consisting of the rotating shaft 19, the gear 20 and the rack part 13c and is shifted between the operative position, in which it confronts the magnetic sheet 1, and the inoperative position as mentioned above.

A lower stabilizing plate 23 is provided with a magnetic head inserting hole 23a, which is in a slot-like shape, and position defining pins 24 which define the position of the upper stabilizing plate 16 relative to the lower stabilizing plate 23. A reference numeral 25 denotes the magnetic head. The magnetic head 25 protrudes through the magnetic head inserting hole 23a in the lower stabilizing plate 23. When the cassette 3 is placed in the predetermined loading position, the magnetic head 25 confronts the lower, or recording, surface of the magnetic sheet 1. The lower stabilizing plate 23 is secured to the chassis 29 of the apparatus as shown in FIG. 3. The position defining pins 24 serve to restrict the vertical position of the upper stabilizing plate 16 to provide a clearance which permits the magnetic sheet 1 to rotate between the upper and lower stabilizing plates 16 and 23. The magnetic head 25 is carried by a head carriage 26. Referring to FIG. 3(b), the head carriage 26 is arranged to be movable along the head inserting hole 23a of the lower stabilizing plate 23 in the directions of arrows D and E, i.e. in the radial direction of the magnetic sheet 1. This arrangement permits the head 25 to change its recording or reproducing position on the magnetic sheet 1. The head carriage 26 is arranged to be moved by a known device (not shown).

Referring to FIGS. 3(a), 3(b) and 3(c), a magnetic sheet rotating motor 27 is secured to the reverse side of the chassis 29. The output shaft 27a of the motor 27 has a sheet rotating spindle 28 mounted on the end part thereof protruding above the surface of the chassis 29. The center core 2 of the magnetic sheet 1 is mounted on this spindle 28 via its hole 2a as shown in FIG. 3(b).

Figure 5:
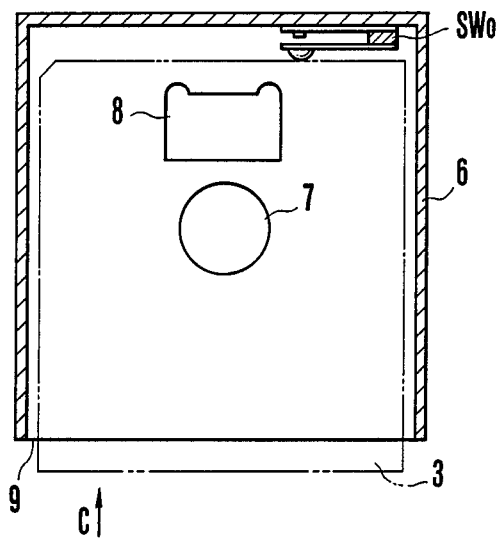
FIG. 5 shows the inside of the cassette holder with the cassette inserted there.

Referring to FIG. 5, a normally-open switch SW0 is disposed on an inner side wall of the cassette holder 6 which is on the opposite side of the cassette inserting opening 9 in the direction of arrow C. When the cassette 3 is inserted into the cassette holder 6 to a predetermined position, the pushing movement of the cassette 3 turns on this switch SW0. With the switch SW0 thus turned on, a control circuit, which will be described later, is provided with information that the cassette 3 has been inserted to the extent of the predetermined position.

Figure 6:
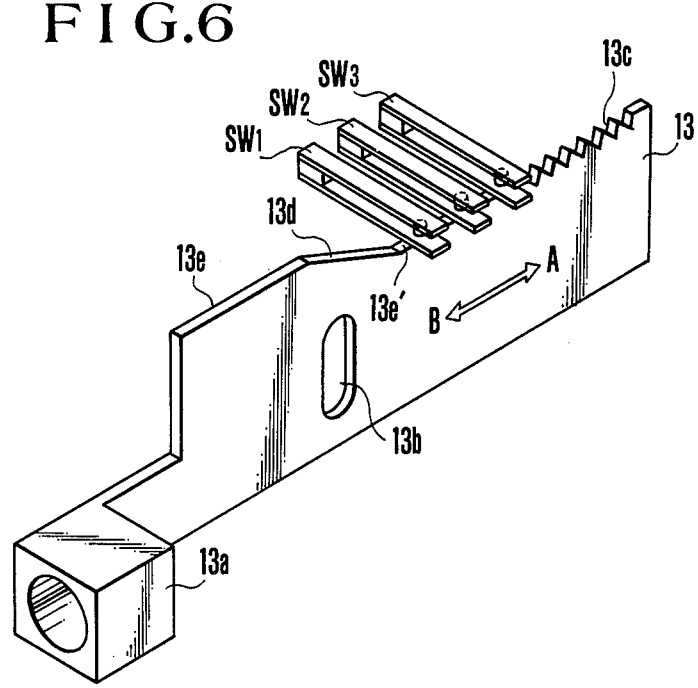
FIG. 6 is a perspective view showing a slider and position detecting switch arrangement with the position detecting switch arrangement disposed on the slider.

FIG. 6 shows three normally-open position detecting switches which are fixedly positioned relative to the slider 13. Referring to FIG. 6, when the rotation of the loading motor 14 in the normal direction causes the slider 13 to move in the direction of arrow A, the slanting part 13d lifts up the moving contact pieces of the position detecting switches SW1, SW2 and SW3 one after another to sequentially turn on these switches in the order of SW1, SW2 and SW3. Then, under a cassette loading completed condition, all the switches SW1, SW2 and SW3 come to be placed on the raised flat part 13e of the slider 13. In the event that, when the loading motor 14 reversely rotates under this condition, the slider 13 is moved in the direction of arrow B. Then, the position detecting switches SW1, SW2 and SW3 come from the raised flat part 13e, via the slanting part 13d, to the lower flat part 13e' which is adjacent to the rack part 13c, and thus the switches SW3, SW2 and SW1 turn off one after another in the named order. Information on the detected position of the slider 13 thus obtained is supplied to the control circuit.

Figure 7:
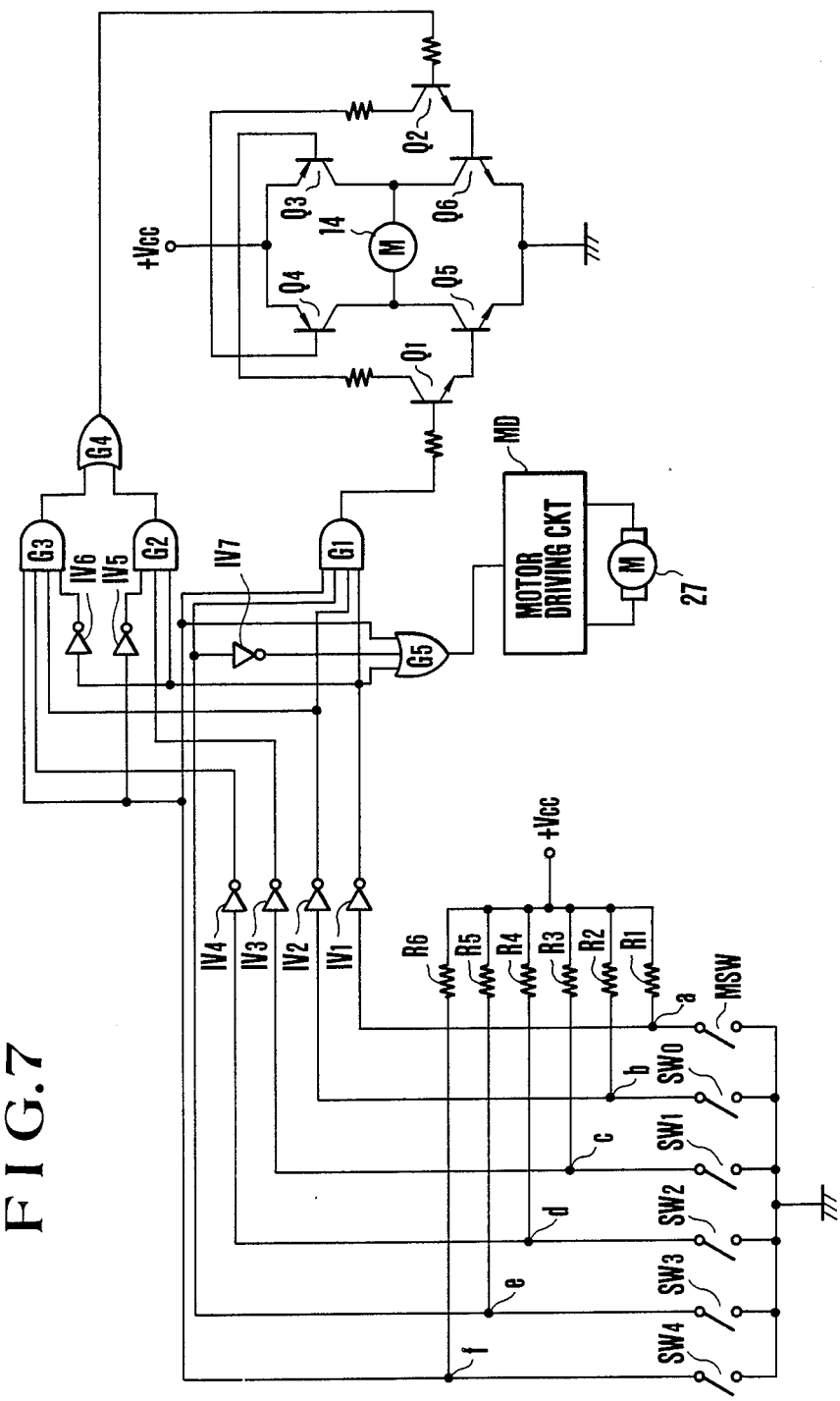
FIG. 7 is a circuit diagram showing the arrangement of a control circuit arranged to control the operation of the mechanism shown in FIG. 1.

Referring to FIG. 7, a switch MSW is arranged to turn on and off the magnetic sheet rotating motor 27. A switch SW0 is arranged as described above with reference to FIG. 5 and is turned on or off according to whether the cassette 3 is completely inserted into the cassette holder 6. Switches SW1-SW3 are arranged as described above with reference to FIG. 6 to detect the position of the slider 13. A switch SW4 is provided for taking out the cassette. The switch SW4 is normally off and is arranged to be turned on in taking out the cassette 3 by, for example, the operation of an eject button or the like. These switches MSW and SW0-SW4 are parallel connected between the positive side of a power supply +Vcc and a circuit ground. Further, each of the switches is arranged such that the level of the potential at each of the connection points "a"-"f" between these switches MSW and SW0-SW4 and resistors R1-R6 becomes high when the switch turns off and low when it turns on. An inverter IV1 is arranged to invert the signal of the connection point "a". An inverter IV2 is arranged to invert the signal of the connection point "b". Inverters IV3 and IV4 are arranged to invert the signals of the connection points "c" and "d". An inverter IV5 is arranged to invert the signal of the connection point "f". Another inverter IV6 is arranged to invert the output of the inverter IV1.

An AND-gate G1 is arranged to obtain the logical product of the signals produced from connection points "e" and "f" and the output signals of the inverters IV1 and IV2. The output of the AND gate G1 is supplied to the base of an NPN switching transistor Q1 which is arranged to cause the loading motor 14 to rotate in the normal direction. An AND-gate G2 is arranged to obtain the logical product of the signals produced from the inverters IV1, IV3 and IV5. An AND gate G3 is arranged to obtain the logical product of the signals produced from the inverters IV2, IV4 and IV6 and the connection point "f". An OR-gate G4 is arranged to obtain the logical sum of signals produced from the AND gates G2 and G3. The signal output of the OR-gate G4 is applied to the base of an NPN switching transistor Q2 which is arranged to cause the loading motor 14 to reversely rotate. PNP and NPN switching transistors Q3, Q4, Q5 and Q6, respectively, form normal rotation and reverse rotation circuits for the loading motor 14. The bases of the transistors Q3 and Q5 are connected to the collector and emitter, respectively, of the switching transistor Q1 for normal rotation of the loading motor 14. The bases of the transistors Q4 and Q6 are connected to the collector and emitter, respectively, of the switching transistor Q2 for reverse rotation of the loading motor 14.

Figure 4A:
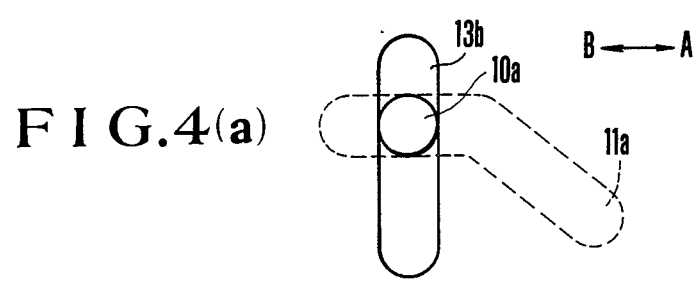
FIGS. 4(a), 4(b) and 4(c) show the essential parts of a cassette holder moving mechanism as in a holder lowering operation in series of steps in their movement.

An inverter IV7 is arranged to invert a signal produced from the connection point "e". An AND gate G5 is arranged to obtain the logical product of signals produced from the inverters IV1 and IV7 and the connection point "f". A sheet rotating motor driving circuit MD is arranged to cause the sheet rotating motor 27 to operate in response to a high level output of the AND gate G5 and to bring the rotation of the motor 27 to a stop when the output level of the AND gate G5 is low. The apparatus which is arranged according to the invention as described above operates as follows:

(1) Loading Operation: With the cassette 3, which contains the magnetic sheet 1, inserted into the cassette holder 6 in the direction of arrow C, the apparatus is in the condition as shown in FIG. 3(a). Under this condition, the cassette holder 6 is in an uplifted position. Since the stabilizing plate holder 18 is not operated, the upper stabilizing plate 16 is kept in a raised position so as not to hinder the insertion of the cassette 3. In this instance, as shown in FIG. 4(a), the guide pin 10a, which is provided on one side of the cassette holder 6, is located in an upper part of the slot 13b, provided in the slider 13, and also in the flat part of the guide slot 11a of the side plate 11. Another guide pin 10b is, of course, located also in the flat part of the guide slot 11b of the side plate 11. With the cassette 3 completely inserted in the cassette holder 6, the cassette insertion detecting switch SW0 which is arranged as shown in FIG. 5 closes. However, all the slider position detecting switches SW1-SW3, which are arranged as shown in FIG. 6, are open as they are in contact with the lower flat part 13e' of the slider 13.

When a main switch (not shown) which is included in the magnetic recording and/or reproducing apparatus is turned on under this condition, the switch MSW closes in response thereto. With the switches MSW and SW0 thus closed, the inverters IV1 and IV2 produce high level signals, which are supplied to the AND gate G1. The other switches SW3 and SW4 still remain open under this condition. Therefore, all the inputs to the AND-gate G1 become high levels with the switches MSW and SW0 closed. Therefore, the AND-gate G1 produces a high level signal to turn on thereby the switching transistor Q1 which is arranged to cause the loading motor 14 to rotate in the normal direction. With the switching transistor Q1 turned on, the transistors Q3 and Q5 turn on. A current from an auxiliary power supply +Vcc flows from the transistor Q3 to the loading motor 14 and further to the transistor Q5. This causes the loading motor 14 to begin to rotate in the normal direction.

At that time, low level signals are produced from the inverters IV5 and IV6. These low level signals are supplied to the AND-gates G2 and G3, respectively. The AND-gates G2 and G3, therefore, both produces low level signals. Accordingly, the OR gate G4 produces a low level signal to thereby turn off the switching transistor Q2 which is arranged to cause the loading motor 14 to reversely rotate. Further, since the output level of the inverter IV7 is low, the output level of the AND gate G5 is also low. The sheet rotating motor 27 is, therefore, inactive.

Figure 4B:
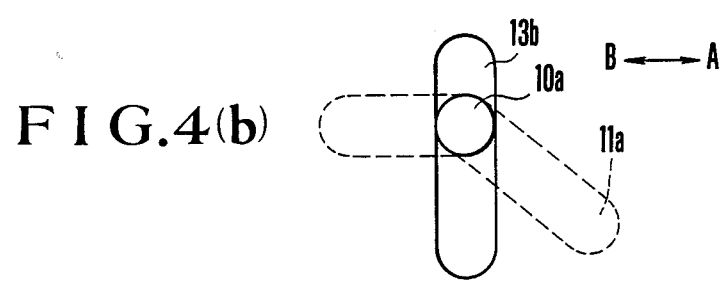
Figure 4C:
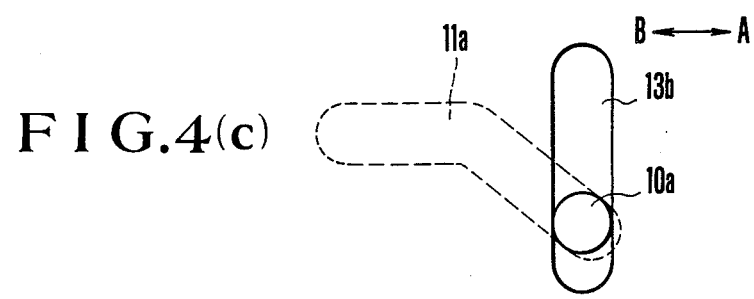

When the loading motor 14 rotates in the normal direction, the screw shaft 15 rotates clockwise. Then, the protruding part 13a, which engages with the screw shaft 15 at the female thread provided inside thereof, moves in the direction of arrow A. This causes the slider 13 to move in the direction of arrow A. With the slider 13 moving in this manner, the guide pin 10a moves rightward along the guide slot 11a by means of the slot 13b of the slider 13 as shown in FIG. 4(b). Following the movement of the guide pin 10a, the cassette holder 6 also moves in the direction of arrow A. The guide pin 10a moves down along the slanting part of the guide slot 11a accordingly as the loading motor 14 further rotates. The guide pin 10a then comes to the lower part of the slot 13b as shown in FIG. 4(c). This downward movement of the guide pin 10a causes the cassette holder 6 to descend from the position shown in FIG. 3(a) to a position shown in FIG. 3(b). With the cassette holder 6 coming down to this position, the magnetic head 25 has access to the magnetic sheet 1 located within the cassette 3 to closely confront it. Then, the center core 2 of the magnetic sheet 1 is mounted on the spindle 28. In this case, the position detecting switches SW1-SW3 ride on the raised flat part 13e of the slider 13 via the slanting part 13d and are closed one after another accordingly, as slider 13 moves in the direction of arrow A.

The gear 20 which engages with the rack 13c of the slider 13 turned counterclockwise causing the rotating shaft 19 to turn in the same direction. This, in turn, causes the stabilizing plate holder 18 to turn counterclockwise moving the upper stabilizing plate 16 downward. When the guide pin 10a reaches the position shown in FIG. 4(c), the cassette holder 6 and the upper stabilizing plate 16 have reached the position shown in FIG. 3(b). As a result, the magnetic sheet 1 is sandwiched in between the upper and lower stabilizing plates 16 and 23 and the magnetic head 25 closely confront the lower surface of the sheet 1. This represents a condition obtained with the cassette 2 completely loaded in the predetermined position within the apparatus. The slider position detecting switch SW3 closes at this point in time. Therefore, the level of the signal produced from the connection point "e" becomes low to cause the output level of the AND gate G1 to become low. Accordingly, the switching transistor Q1 turns off. This causes the transistors Q3 and Q5 to turn off. Therefore, the loading motor 14 comes to a stop. Further, with the switch SW3 turned on, the output level of the inverter IV7 becomes high. The output level of the AND gate G5 also becomes high. The motor driving circuit MD then actuates the sheet rotating motor 27. The spindle 28 then rotates to cause the magnetic sheet 1 to rotate between the upper and lower stabilizing plates 16 and 23 for the head 25. This enables the head 25 to record or reproduce a signal on or from the magnetic sheet 1. Under this condition, the recording or reproducing position of the head 25 on the magnetic sheet 1 can be shifted by shifting the head carriage 26 in the direction of arrow D or E as shown in FIG. 3(b) by some suitable shifting means (not shown).

(2) Cassette Taking-Out Operation: With the cassette 3 in the predetermined loaded state for recording or reproducing as shown in FIG. 3(b), the switches MSW and SW0-SW3 are closed while the cassette taking-out switch SW4 alone is open. When the eject button or the like operation member is operated to close the cassette taking-out switch SW4 under this condition, the output level of the inverter IV5 becomes high. This high level signal produced from the inverter IV5 is supplied to the AND-gate G2. Since high level signals produced from other inverters IV1 and IV3 have already been supplied also to the AND-gate G2 by then, the output level of the AND-gate G2 becomes high. Further, since the level of the signal produced from the connection point "f" of the switch SW4 at this instant becomes low, the outputs of the AND-gates G1 and G3 are kept at high levels. The high level output of the AND-gate G2 makes the output level of the OR-gate G4 high. The high level output of the OR gate G4 is applied to the base of the switching transistor Q2 and turns on the transistor Q2. This, in turn, causes the transistors Q4 and Q5 to turn on. As a result, a current from the auxiliary power supply +Vcc comes to flow in the following route: The transistor Q4→the loading motor 14→the transistor Q6. This causes the loading motor 14 to begin to reversely rotate.

With the loading motor 14 reversely rotating, the screw shaft 15 also reversely rotates to move the slider 13 in the direction of arrow B. The guide pin 10a which is in the position as shown in FIG. 4(c) is guided jointly by the slot 13b of the slider 13 and the guide slot 11a of the side plate 11 and is thus moved back to the original position thereof as shown in FIG. 4(a) through the position shown in FIG. 4(b). The cassette holder 6 then comes back to its raised position as shown in FIG. 3(a). The gear 20, which engages with the rack 13c of the slider 13, is then caused to turn clockwise by the movement of the rack 13c in the direction of arrow B. The clockwise turn of the gear 20 causes the rotating shaft 19 to turn in the same direction. This, in turn, causes the stabilizing plate holder 18 to turn clockwise. The upper stabilizing plate 16, which is confronting the magnetic sheet 1, is thus moved upward. The apparatus thus changes from the loading completed state of FIG. 3(b) back to the initial state of FIG. 3(a) through the state as shown in FIG. 3(c).

In this case, the slider position detecting switches SW1-SW3 are caused by the movement of the slider 13 in the direction of arrow B to move from the raised flat part 13e to the lower flat part 13e' via the slanting part 13d. Therefore, they open one after another in sequence of SW3→SW2→SW1 with the switch SW1 last to open. When the switch SW1 opens, the output level of the inverter IV3 becomes low. This causes the AND-gate G2 to produce a low level signal. Accordingly, the OR-gate G4 also produces a low level signal. The low level signal form the OR-gate G4 is supplied to the base of the reverse rotating switching transistor Q2 to turn it off. The transistors Q3 and Q6 also turn off. The loading motor 14 is thus brought to a stop. With the motor 14 coming to a stop, the cassette taking-out operation comes to an end.

Further, when the switch SW4 is closed, the output level of the AND gate G5 becomes low causing the motor driving circuit MD to bring the sheet rotating motor 27 to a stop.

(3) Operation for preventing deformation of the magnetic sheet: If the improvement according to the present invention is not applied to apparatus, when the main switch is opened with the cassette 3 loaded or placed in the predetermined position for recording or reproduction as shown in FIG. 3(b), the apparatus would be left in that condition of being loaded with the cassette 3. In that case, the magnetic sheet 1 is kept in a warped state as the recording or reproducing head 25 is protruding through the hole part 23a of the lower stabilizing plate 23 toward the head escaping groove 16a provided in the upper stabilizing plate 16 which confronts the upper surface of the magnetic sheet 1 in the manner as shown in an enlarged state in FIG. 1(a). Keeping the magnetic sheet 1 in such a state over a long period of time tends to result in plastic deformation of the sheet 1. In some extreme case, the recording or reproducing head 25 might stick to the sheet 1. Then, if the magnetic sheet 1 is rotated under such a condition, the magnetic layer of the sheet 1 might be peeled off. Such plastic deformation of the magnetic sheet 1 not only makes recording or reproduction impossible on or from the deformed part but also causes uneven rotation of the magnetic sheet 1. Further, in the event of peeling off of the magnetic layer of the sheet 1, there arises a grave omission of a part of the recording or reproducing signal.

Figure 1A:
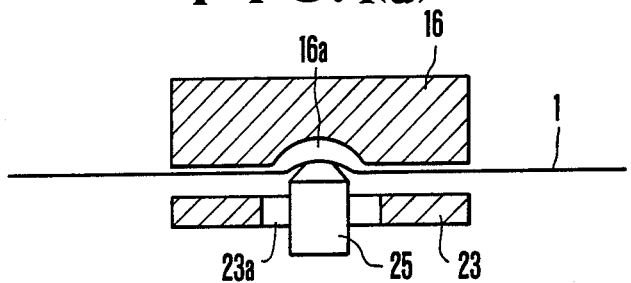
FIGS. 1(a), 1(b) and 1(c) are sectional views showing the positional relation between a magnetic sheet, a pair of stabilizing plates and a magnetic head, FIG. 1(a) showing them as in a recording or reproducing condition with the upper and lower stabilizing plates and the magnetic head closely confronting the magnetic sheet, respectively.
Figure 1B:
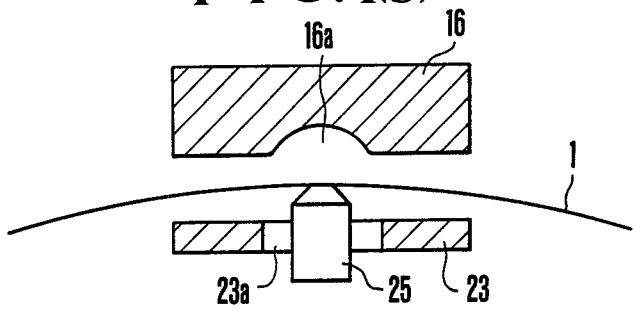
Figure 1C:
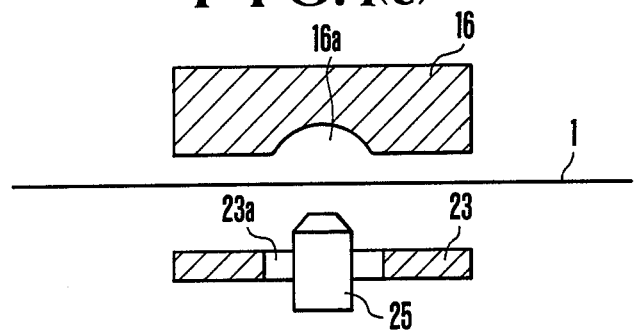

This inconvenience might be avoidable by lifting up the upper stabilizing plate 16 alone away from the magnetic sheet 1 as shown in FIG. 1(b). In that case, however, the magnetic sheet 1 is still left in a state of closely confronting the recording or reproducing head 25. Then, although an extreme plastic deformation such as the one as shown in FIG. 1(a) may be avoidable, there still remains the possibility of some minor plastic deformation.

Whereas, in the case of this embodiment of the invention, the plastic deformation of the magnetic sheet 1 can be effectively prevented in the following manner:

Under the cassette loading completed condition as shown in FIG. 3(b), when the main switch (not shown) is opened, the switch MSW, which is interlocked with the main switch, opens. The inverter IV1 then produces a low level signal. This causes the motor driving circuit MD to bring the sheet rotating motor 27 to a stop. With the output level of the inverter IV1 thus becoming low, the inverter IV6 produces a high level signal, which is supplied to the AND gate G3. Since the cassette 3 is inserted in the cassette holder in this instance, the cassette insertion detecting switch SW0 is on. Therefore, the level of the signal produced from the inverter IV2 is high. Further, since the slider position detecting switch SW2 is closed at that time, the inverter IV4 also produces a high level signal. Since the cassette taking-out switch SW4 is open, a signal produced from the connection point "f" is at a high level. In this manner, when the sheet rotating motor 27 is brought to a stop with the switch MSW opened, the AND-gate G3 has all the inputs thereof at high levels. Therefore, the AND-gate G3 produces a high level signal. At that time, with the switch MSW opened, the AND-gates G1 and G2 receive a low level signal from the inverter IV1. As a result, the outputs of both the AND-gates G1 and G2 remain at low levels. The high level signal from the AND-gate G3 causes the OR-gate G4 to produce a high level signal. The high level signal from the OR-gate G4 turns on the loading motor reverse rotating switching transistor Q2. with the transistor Q2 turned on, the transistors Q4 and Q6 turn on. Then, the current of the auxiliary power supply +Vcc flows in the following manner: Transistor Q4→loading motor 14→transistor Q6. The loading motor 14 then begins to reversely rotate. The reverse rotation of the loading motor 14 raises the cassette holder 6 and the upper stabilizing plate 16 in the same manner as in the case of the above-stated cassette taking-out operation. The magnetic sheet 1 is thus moved away from the magnetic head 25. However, the magnetic sheet deformation preventing operation differs from the cassette taking-out operation described in the foregoing in the following point: When the slider position detecting switch SW2 is opened by the movement of the slider 13, the inverter IV4 supplies a low level signal to the AND-gate G3. The AND-gate G3, therefore, produces a low level signal. The low level signal from the AND-gate G3 causes the OR gate G4 to produce a low level signal to turn off the switching transistor Q2. With the transistor Q2 thus turned off, the transistors Q4 and Q5 turn off to bring the loading motor 14 to a stop.

In this instance, the slider 13 is moved to a slight extent in the direction of arrow B. The rack 13c also moves accordingly to cause the gear 20 to turn clockwise to a slight degree. This, in turn, causes the stabilizing plate holder 18 to turn clockwise to a slight degree to slightly lift up the upper stabilizing plate 16 as shown in FIG. 3(c). The upper stabilizing plate 16 is thus brought to an intermediate position between an operative position and an inoperative position. At that time, the guide pin 10a, which is provided on one side of the cassette holder 6, moves from the position thereof shown in FIG. 4(c) to an intermediate point of the slanting part of the guide slot 11a of the side plate 11. This brings the cassette holder 6 to an intermediate position which is as shown in FIG. 3(c) between the loading position and the unloading position and is a little higher than the loading completed state of FIG. 3(b). The cassette holder 6 is thus moved away from the magnetic head 25 and is set in a state as shown in FIG. 3(c). Under this condition, the magnetic sheet 1 is away from the magnetic head 25, so that plastic deformation of the magnetic sheet 1 by the head 25 can be prevented.

Further, under this condition, i.e. with the switches MSW and SW2–SW4 open and switches SW0 and SW1 closed, when the main switch (not shown) is closed to again operate the apparatus, the switch MSW closes in response to the main switch. Then, the inverter IV1 produces a high level signal, which is supplied to the AND-gate G1. Since the cassette insertion detecting switch SW0 is closed under this condition, the inverter IV2 produces a high level signal. Meanwhile, since the position detecting switch SW3 is open, the level of the signal of the connection point "e" is high. Further, since the cassette taking-out switch SW4 is open, the level of the signal of the connection point "f" also becomes high. Therefore, with the switch MSW closed, the AND-gate G1 has all the inputs thereof at high levels and thus produces a high level signal. The high level signal from the AND-gate G1 turns on the switching transistor Q1. This in turn causes the transistors Q3 and Q5 to turn on. The loading motor 14 then begins to rotate in the normal direction. Then, as mentioned in the description of the loading operation given in the foregoing, the switch SW3 closes when the cassette holder 6, containing the cassette 3 therein, is moved down to the predetermined position as shown in FIG. 3(b). With the switch SW3 thus closed, the level of the signal of the connection point "e" becomes low. The AND-gate G1 therefore comes to produce a low level signal. The low level signal from the AND-gate G1 turns off the switching transistor Q1. The loading motor 14 then comes to a stop. Further, with the switch SW3 closed, the output level of the inverter IV7 becomes high. The high level output of the invert IV7 causes the motor driving circuit MD to actuate the sheet rotating motor 27. The spindle 28 then rotates the magnetic sheet 1 in the manner as mentioned in the foregoing In accordance with this invention, as has been described in the foregoing, the record-bearing medium is moved away from the recording and/or reproducing head to prevent, without fail, the plastic deformation of the medium from being caused by the head. In another conceivable method for separating the medium and the head from each other for that purpose, the head is moved away from the medium instead of moving the latter away from the former. In that case, however, the head shifting mechanism requires a complex arrangement and tends to impair the precision of control over the position of the head on the record bearing medium. Whereas, since the record bearing medium is to be moved by the loading means to a predetermined loading position for the purpose of recording and/or reproduction, the arrangement to move the medium instead of the head for the purpose of preventing plastic deformation of the medium requires only simple additional control over the loading means. Therefore, the invented arrangement advantageously permits simplification of the mechanism required for this purpose without causing and degradation of the precision of control to be carried out over the position of the head on the record bearing medium.

What is claimed is:

1. A recording and/or reproducing apparatus using a disc-shaped flexible record-bearing medium, comprising:

(A) loading means for placing the medium at a predetermined position for signal recording and/or reproduction;
(B) a recording and/or reproducing head arranged to confront a recording surface of the medium when the medium is placed at said predetermined position;
(C) rotation means for rotating the medium relative to said head;
(D) stop means for stopping the rotation of the medium by said rotation means; and
(E) control means responsive to said stop means for causing said loading means to retract the medium from said predetermined position, said control means having a first mode and a second mode, said control means ejecting the medium in response to said stop means in said first mode, and, in said second mode, moving the medium to a predetermined stand-by position near said head in response to said stop means and holding the same there, said stand-by position being closer to the head than the ejection position but being separated from the head.

2. The apparatus according to claim 1, wherein said loading means includes:
a holder movable between a first position for receiving the medium and a second position for placing the received medium at said predetermined position; and
a holder moving mechanism for moving said holder between said first and said second positions,
said control means moving the holder to said first position, by means of said moving mechanism, to eject the medium in the first mode, and, in the second mode, holding the holder, by means of said moving mechanism, at a predetermined position corresponding to said stand-by position between said first position and said second position.

3. A recording and/or reproducing apparatus using a disc-shaped flexible record-bearing medium, comprising:
(A) loading means for placing the medium at a predetermined position for signal recording and/or reproduction;
(B) a recording and/or reproducing head arranged to confront a recording surface of the medium when the medium is placed at said predetermined position;
(C) rotation means for rotating the medium relative to said head;
(D) stabilizing means for stabilizing the medium near said head;
(E) moving means for moving said stabilizing means to an operative position at which the stabilizing means confronts an opposite surface of the medium placed at said predetermined position to stabilizie the medium near said head;
(F) stop means for stopping the rotation of the medium by said rotation means; and
(G) control means responsive to said stop means for causing said loading means to retract the medium from said predetermined position and for causing said moving means to retract said stabilizing means from said operative position, said control means having a first mode and a second mode and moving said stabilizing means to a first retraction position and a second retraction position in response to said stop means and holding the same there, respectively, in said first and second modes, wherein in said first retraction position, said stabilizing means is held so as not to interfere with ejection of the medium, and in said second retraction position, said stabilizing means is held in a position which prevents deformation of the medium by the stabilizing means after actuation of the stop means.

4. The apparatus according to claim 3, wherein said loading means includes:

a holder movable between a first position for receiving the medium and a second position for placing the received medium at said predetermined position; and a holder moving mechanism for moving said holder between said first and said second positions, said moving means being arranged to move said stabilizing means between said first retraction position and said operative position in response to the movement of said holder between said first and second positions, and said control means being arranged to cause said holder moving mechanism to move said holder to a predetermined position between said first and second positions and to cause said moving means to move said stabilizing means to said second retraction position, in response to said stop means in said second mode.

5. A magnetic recording and/or reproducing apparatus using a disc-shaped flexible magnetic sheet which is provided with a center core and is housed within a cassette having an opening for exposing a portion of a recording surface of the housed magnetic sheet, said apparatus comprising:

(A) a cassette holder movable between a first position for receiving the cassette and a second position for placing the received cassette at a predetermined position for signal recording and/or reproduction;

(B) a moving mechanism for moving said holder between said first and said second positions, said moving mechanism being able to support the holder at said first position and a third position between said first position and said second position with said magnetic sheet within said cassette being separated from said head when said head is at the third position;

(C) a magnetic head for recording signals on and/or reproducing recorded signals from the magnetic sheet, said head being arranged to confront the recording surface of the magnetic sheet through the opening of the cassette when the cassette is placed at said predetermined position;

(D) a spindle engageable with the center core of the magnetic sheet when the cassette is placed at said predetermined position;

(E) a motor for rotating said spindle;

(F) deactivating means for deactivating said motor; and (G) control means responsive to said deactivating means for selectively causing said moving mechanism to hold said cassette holder at said third position between said first and second positions so that the magnetic sheet is retracted from said head, whereby said medium is protected from deformation and a start-up time is minimized, or to move said cassette holder to said first position for ejecting said cassette.

6. A magnetic recording and/or reproducing apparatus using a disc-shaped flexible magnetic sheet which is provided with a center core and is housed within a cassette having a first and a second openings for respectively exposing portions of a recording surface and an opposite surface of the housed magnetic sheet, said apparatus, comprising:

(A) a cassette holder movable between a first position for receiving the cassette and a second position for placing the received cassette at a predetermined position for the signal recording and/or reproduction;

(B) a magnetic head for recording signals on and/or reproducing recorded signals from the magnetic sheet, said head being arranged to confront the recording surface of the magnetic sheet through the first opening of the cassette when the cassette is placed at said predetermined position;

(C) a spindle engageable with the center core of the magnetic sheet when the cassette is placed at said predetermined position;

(D) a motor for rotating said spindle;

(E) a stabilizing plate for stabilizing the magnetic sheet near said head, said stabilizing plate being movable between a reset position and an operative position at which the plate confronts the opposite surface of the magnetic sheet through the second opening of the cassette placed at said predetermined position to stabilize the magnetic sheet;

(F) a moving mechanism for moving and holding said holder between said first and said second positions and for moving and holding said stabilizing plate between said reset and said operative positions;

(G) deactivating means for deactivating said motor; and (H) control means responsive to said deactivating means for selectively causing said moving mechanism to hold said holder out a stand-by position between said first and said second positions and for holding said stabilizing plate at stand-by position between said reset and said operative positions.

7. A recording and/or reproducing apparatus using a disc-shaped flexible record-bearing medium, comprising:

(a) a recording and/or reproducing head arranged to selectively confront a recording surface of the medium;

(b) a stabilizing means for stabilizing the medium near said head, said stabilizing means having three positions:

a first position at which said medium is stabilized near said head, a second position at which said medium is not stabilized, and which is apart from said medium by a predetermined distance, and a third position at which said medium is not stabilized and which is more apart from said medium than said second position; and (c) control means for holding said stabilizing means selectively at said first position for recording and/or reproducing, at said second position for preventing deformation of said medium, or at said third position for allowing ejection of said medium.

8. An apparatus according to claim 7, further comprising rotating means for rotating said medium in a condition stabilized by said stabilizing means to said first position.

9. An apparatus according to claim 8, wherein said control means moves said stabilizing means to said second position as the rotation of said medium stops.

* * * * *